(12) United States Patent
Stupplebeen et al.

(10) Patent No.: US 8,690,320 B2
(45) Date of Patent: Apr. 8, 2014

(54) CONTACT LENSES HAVING HYBRID ORIENTATION FEATURES

(75) Inventors: Robert K. Stupplebeen, Webster, NY (US); Jennifer Zuba, Portland, OR (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 13/481,041

(22) Filed: May 25, 2012

(65) Prior Publication Data

US 2012/0307200 A1 Dec. 6, 2012

Related U.S. Application Data

(60) Provisional application No. 61/492,064, filed on Jun. 1, 2011.

(51) Int. Cl.
*G02C 7/04* (2006.01)
(52) U.S. Cl.
USPC ............... 351/159.14; 351/159.1; 351/159.02
(58) Field of Classification Search
USPC .............. 351/159.05–159.07, 159.1, 159.12, 351/159.14, 159.17, 159.19, 159.21, 351/159.36, 159.38, 159.52, 159.54, 159.72
See application file for complete search history.

(56) References Cited

U.S. PATENT DOCUMENTS

| 4,618,229 | A | | 10/1986 | Jacobstein et al. | |
|---|---|---|---|---|---|
| 5,100,225 | A | * | 3/1992 | Rothe | 351/159.19 |
| 5,971,542 | A | * | 10/1999 | Volker et al. | 351/159.41 |
| 7,036,931 | B2 | * | 5/2006 | Lindacher et al. | 351/159.41 |
| 2008/0030676 | A1 | * | 2/2008 | Back | 351/160 R |
| 2009/0115963 | A1 | * | 5/2009 | Ye et al. | 351/160 R |

FOREIGN PATENT DOCUMENTS

| DE | 3003985 | 8/1981 |
|---|---|---|
| EP | 2278387 | 1/2011 |
| FR | 2921163 | 3/2009 |
| GB | 2041557 | 9/1980 |

OTHER PUBLICATIONS

International Search Report (PCT/ISA/210) and Written Opinion (PCT/ISA/237) mailed on Jul. 13, 2012.

* cited by examiner

*Primary Examiner* — Evelyn A Lester
*Assistant Examiner* — William Alexander
(74) *Attorney, Agent, or Firm* — Toan P. Vo; Glenn D. Smith

(57) ABSTRACT

A contact lens such as a toric contact lens having hybrid stabilization features is disclosed. The lens includes a lens edge, a vertical meridian, a horizontal meridian, a superior region, an inferior region, an optical zone, a prism ballast zone and a peri ballast zone, wherein the contact lens has a dimple zone disposed between the optical zone and the lens edge and is centered on the inferior vertical meridian.

24 Claims, 1 Drawing Sheet

CONTACT LENSES HAVING HYBRID ORIENTATION FEATURES

CROSS REFERENCE

This application claims the benefit of Provisional Patent Application No. 61/492,064 filed Jun. 1, 2011 which is incorporated by reference herein.

TECHNICAL FIELD

The present invention generally relates to a contact lens having hybrid stabilization features.

BACKGROUND OF THE INVENTION

Contact lenses having a toric optical zone (commonly referred to as "toric contact lenses") are used to correct refractive abnormalities of the eye associated with astigmatism. The toric optical zone provides cylindrical correction to compensate for astigmatism. Since astigmatism that requires vision correction is usually associated with other refractive abnormalities, such as myopia (nearsightedness) or hypermetropia (farsightedness), toric contact lenses are generally prescribed also with a spherical correction to correct myopic astigmatism or hypermetropic astigmatism. A toric surface is formed on either the posterior lens surface (to achieve a "back surface toric lens") or the anterior lens surface (to form a "front surface toric lens").

Whereas spherical contact lenses may freely rotate on the eye, toric contact lenses have a stabilization structure to inhibit rotation of the lens on the eye so that the cylindrical axis of the toric zone remains generally aligned with the axis of the astigmatism. In general, a stabilization structure may include one or more sections of the lens periphery which are thicker (or thinner) than other sections to provide the stabilization. For example, a ballast is a thick portion that may assume a downward position when a lens is inserted in an eye, and the ballast axis of a lens extends in the vertical direction when a lens assumes its position on the eye. Other stabilization structures are known in the art. Regardless of the structure of the stabilization structure, the axis that extends in the up and down direction when a lens assumes its position on the eye will be referred to herein as the ballast axis.

The nature of prism ballasting is to move the apex of the lens down from the horizontal meridian. In traditional prism ballasted lenses, a crescent shaped portion of the overall larger anterior optical zone is located outside of the posterior optical zone. This crescent shaped portion of the anterior optical zone is the most inferior portion of the optical zone and thickens thereby resulting in decreased Dk/t and comfort.

Toric contact lenses are manufactured with a selected relationship (referred to herein as offset) between the cylindrical axis of the toric optical zone and the orientation of the stabilization structure. This relationship is expressed as a number of degrees that the cylindrical axis is offset from the ballast meridian. Toric contact lenses are also manufactured with a selected orientation of the sphere power meridian of the toric surface relative to a horizontal meridian as determined by a corresponding rotational stabilization structure (e.g., a contact lens prism ballast). The orientation is referred to herein as an angular offset (hereinafter referred to simply as axis). For example, this relationship may be expressed as a number of degrees that the sphere power meridian is angularly displaced from a horizontal meridian of the lens as determined by the ballast. Accordingly, toric contact lens prescriptions specify offset, with toric lenses generally being offered in 10-degree increments ranging from 10 degrees to 180 degrees.

In toric contact lenses, the optical zone provides cylindrical correction to compensate for astigmatism. The resulting optical zone has a sphere power meridian and a cylinder power meridian. The orientation of each of the above meridians is best understood with reference to conventional contact lens prescriptions. In a prescription −3.00/−1.25, the sphere power meridian is the meridian having a power equal to −3.00 diopters and the cylinder power meridian is the meridian having a power equal to −4.25 diopters. In a prescription +3.00/−1.25, the sphere power meridian is the meridian having a power equal to +3.00 diopters and the cylinder power meridian is the meridian having a power equal to +1.75 diopters.

Rotational stability may be achieved using a number of ballasting designs including inferior truncation, double truncation, thin zones (also called "double slab-off") and prism wedge profile. These ballasting designs may be used individually or in combination. One common feature of these ballasting designs is the use of different thickness areas in the lens to achieve rotational stability. For example, in the case of a "slab off" design, the top and bottom portions of the lens are thinned out such that when they are positioned under the eyelids they are held in place by the lids. At the same time, the thicker portions of the lens are positioned in between the eyelids where they too are held in place by abutting against the eyelids.

Although entirely satisfactory in many respects, there is still a need for additional types of ballasting designs for a toric lens. This need is especially seen in efforts to provide toric lenses having better optics, improved comfort and better on eye orientation in both rotational recovery and primary gaze orientation (PGO) than traditionally ballasted lenses.

SUMMARY

In accordance with one embodiment of the present invention, there is provided a contact lens comprising a lens edge, a vertical meridian, a horizontal meridian, a superior region, an inferior region, an optical zone, a prism ballast zone and a peri ballast zone, wherein the contact lens has a dimple zone disposed between the optical zone and the lens edge and is centered on the inferior vertical meridian.

In accordance with a second embodiment of the present invention, there is provided a contact lens comprising: a lens edge, a vertical meridian, a horizontal meridian, a superior region, an inferior region, a posterior surface; an opposing anterior surface, an optical zone, a prism ballast zone, a peri ballast zone, and a prism ballast/peri ballast blend zone disposed between the optical zone and the lens edge, wherein the contact lens has a dimple zone disposed between the optical zone and lens edge and is centered on the inferior vertical meridian.

In accordance with a third embodiment of the present invention, there is provided a contact lens comprising a lens edge, a vertical meridian, a horizontal meridian, a superior region, an inferior region, a posterior surface; an opposing anterior surface, an optical zone including a posterior optical zone and an anterior optical zone, a prism ballast zone, a peri ballast zone, and a prism ballast/peri ballast blend zone disposed between the optical zone and the lens edge, wherein the contact lens has a dimple zone disposed between the optical zone and the lens edge and is centered on the inferior vertical meridian and further wherein the peri ballast zone spans about 20 degrees and has a maximum thickness of about 240 μm, the prism ballast/peri ballast blend zone spans about 10 degrees and is located between 3 and 4 o'clock, and the dimple zone spans about 25 to about 35 degrees centered on the inferior vertical meridian and has a thickness between about 70 to about 220 μm.

The contact lenses of the present invention having hybrid stabilization features are believed to advantageously provide better optics, improved patient comfort and better on eye orientation in both rotational recovery and PGO than traditionally ballasted lenses.

BRIEF DESCRIPTION OF THE DRAWINGS

Illustrative, non-limiting embodiments of the present invention will be described by way of example with reference to the accompanying drawings, in which the same reference number is used to designate the same or similar components in different figures, and in which.

DETAILED DESCRIPTION

Dimensions described herein refer to dimensions of a finished lens. For example, the toric contact lenses of the present invention are fully cured and, in embodiments including hydrophilic materials, the lenses are fully hydrated.

The present invention provides stabilized contact lenses, especially contact lenses having a cylindrical correction for astigmatism. The present invention also provides contact lenses having thickened zones thereon that interact with the blinking action of the eyelids to rotationally stabilize the lens. The rotational stability is useful for any contact lens that is non-axi-symmetric. For example, the rotational orientation of toric lenses must be maintained for proper correction. It should be understood, however, that rotational stability may also be desirable for other specialized lenses such as those that correct other aberrations.

In the following description, a number of surfaces and thicknesses of the contact lenses of the present invention will be described with reference to schematic plan views of the lenses. Contact lenses typically possess an underlying spherical curvature, with the anterior face being convex, and the posterior face being concave. In other words, the lens body has an overall spherical curvature with a concave posterior face adapted to contact the cornea opposite an outwardly-facing convex anterior face. The various surfaces and optic zones are then specified from the base sphere. For simplicity, the views shown herein are flattened, with the base sphere removed. In this way, the lines of shading corresponding to the underlying spherical curvature are removed so that the particular surfaces and thicknesses of the present invention can be more clearly illustrated. Thickness shall be defined as the distance between the anterior surface and the posterior surface.

Figure 1:
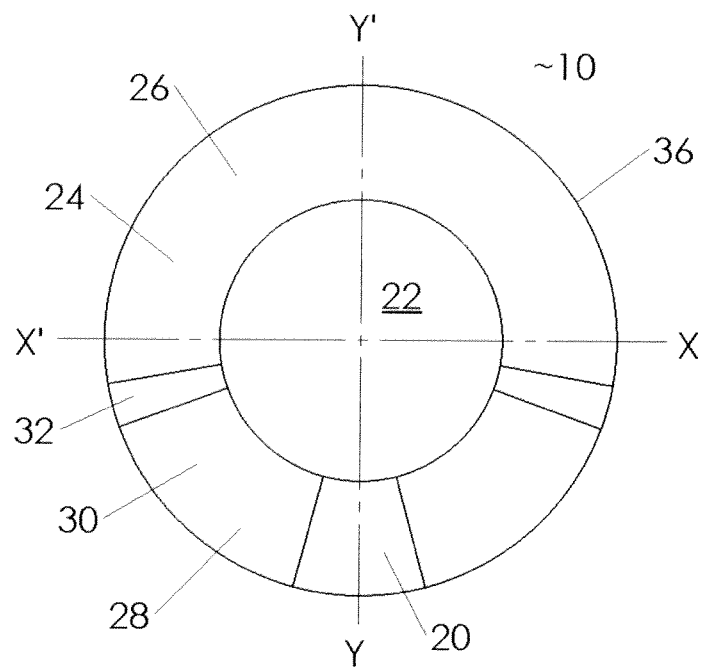
FIG. 1 is a plan view of a contact lens according to one embodiment of the present invention.

An exemplary contact lens 10 of the present invention is thus shown in FIG. 1 flattened without shading to illustrate various zones thereon. The lens 10 includes a lens body of suitable soft or rigid material. Soft contact lenses are typically made of a hydrophilic material such as hydroxyethyl-methacrylate, silicone rubbers, silicone hydrogels, urethanes, etc. Alternatively, a rigid gas-permeable material such as siloxane acrylate or fluorosiloxane acrylate may be used.

The lens 10 includes a vertical meridian Y-Y', a horizontal meridian X-X', a posterior surface and an anterior surface. The superior region 26 is the portion of lens 10 which is located above horizontal meridian X-X' and to the lens edge 36. The inferior region 26 is the portion of lens 10 which is located below horizontal meridian X-X' and to the lens edge 36. A lens edge 36 defines the intersection of the anterior and posterior surfaces. Optical zone 22 of the posterior surface is toric, i.e., this zone has a toric surface that provides a desired cylindrical correction, and may include spherical power. It is to be appreciated that a toric surface may be specified using terms of any suitable order. The optical zone contains curvature which defines the refractive correction of the lens including sphere power, cylinder, and axis. The optical zone may also be symmetric about the vertical meridian depending on the axis of the prescription of the lens. As one skilled in the art will readily appreciate, optical zone 22 may be circular, toroidal, or any other suitable shape. The entire lens outside of optical zone 22 is typically symmetric about the vertical meridian Y-Y'.

The present invention further pertains to contact lenses such as toric contact lenses having rotational stabilization mechanisms thereon, including those with ballasts, e.g., prism ballasts, and peri ballasts. A ballasted lens provides a thickness gradient over which the eyelid slides to re-orient the lens, generally about its optical axis. A prism ballast provides a wedge or tapered ballast for interaction with the eyelids even in the optic, while a periballast is exclusive of the optic.

Accordingly, lens 10 includes a prism ballast zone 24 including at least a portion of optical zone 22 and beginning in the superior region 26. Lens 10 further includes a peri ballast (also known as "peripheral ballast") zone 28 disposed between the optical zone 22 and the lens edge 36 and beginning in the inferior region 30. The prism ballasted zone is defined by the small, but significant, prism-ballasting of the lens. The prism ballasted zone may be composed of a single curve (see FIG. 1) or may be composed of multiple curves. As one skilled in the art will readily appreciate, the prism ballast zone 24 includes at least a portion of the optical zone 22 and begins in the superior region 26. The prism ballasted zone may extend into the inferior region 30 as generally depicted in FIG. 1. Alternatively, the peri ballast zone 28 may extend into the superior region 26 (not shown).

The lens 10 further includes a dimple zone 20 disposed between the optical zone 22 and the lens edge 36 and is centered on the inferior vertical meridian of vertical meridian Y-Y', i.e., the dimple zone 20 is in the peri ballast zone 28. The term "dimple zone" as used herein shall be understood to mean a zone having relatively less thickness (i.e., a locally thin zone) than the thickness of the peri ballast zone located adjacent to the dimple zone (see, e.g., the white areas set forth in FIG. 1). In one embodiment, the dimple zone spans about 5 to about 45 degrees centered on the inferior vertical meridian. In one embodiment, the dimple zone spans about 5 to about 20 degrees centered on the inferior vertical meridian. In one embodiment, the dimple zone spans about 25 to about 35 degrees centered on the inferior vertical meridian.

The thickness of the dimple zone will ordinarily range from about 25 to about 400 μm. In one embodiment, the dimple zone has a thickness between about 50 to about 250 μm. In one embodiment, the dimple zone has a thickness between about 70 to about 220 μm. As stated above, the "dimple zone" is a zone having relatively less thickness than the thickness of the peri ballast zone 28 located adjacent to the dimple zone. Accordingly, in one embodiment, the peri ballast zone has a maximum thickness between about 100 to about 500 μm. In one embodiment, the peri ballast zone has a maximum thickness between about 200 to about 400 μm. In one embodiment, the peri ballast zone has a maximum thickness of about 240 μm. In one embodiment, the maximum peri ballast thickness spans about 20 degrees when starting at plus or minus 30 degrees from the inferior vertical meridian, The lens 10 further includes at least one prism ballast/peri ballast blend zone 32 disposed between the optical zone 22 and lens edge 36 and between the prism ballast zone 24 and peri ballast zone 28. The blend zone is symmetrical relative to the vertical meridian Y-Y' and is a non-optically corrected region that provides a more gradual transition from the prism ballast zone 24 to the peri ballast zone 28 than would occur if the prism ballast zone 24 were immediately adjacent to peri ballast zone 28. The prism ballast/peri ballast blend zone is believed to provide improved comfort to the wearer. In one embodiment, the prism ballast/peri ballast blend zone 32 spans about 1 to about 45 degrees. In one embodiment, the prism ballast/peri ballast blend zone 32 spans about 5 to about 20 degrees. In one embodiment, the prism ballast/peri ballast blend zone 32 spans about 10 degrees.

In one embodiment, the prism ballast/peri ballast blend zone 32 is symmetric about the vertical meridian Y-Y'. In one embodiment, the prism ballast/peri ballast blend zone 32 is located between about 1 o'clock and about 5 o'clock when the most superior region of the lens is 12 o'clock and the most inferior region is 6 o'clock. In one embodiment, the prism ballast/peri ballast blend zone 32 is located between about 2 o'clock and about 4 o'clock. In one embodiment, the prism ballast/peri ballast blend zone 32 is located between about 3 o'clock and about 4 o'clock.

Figure 2:
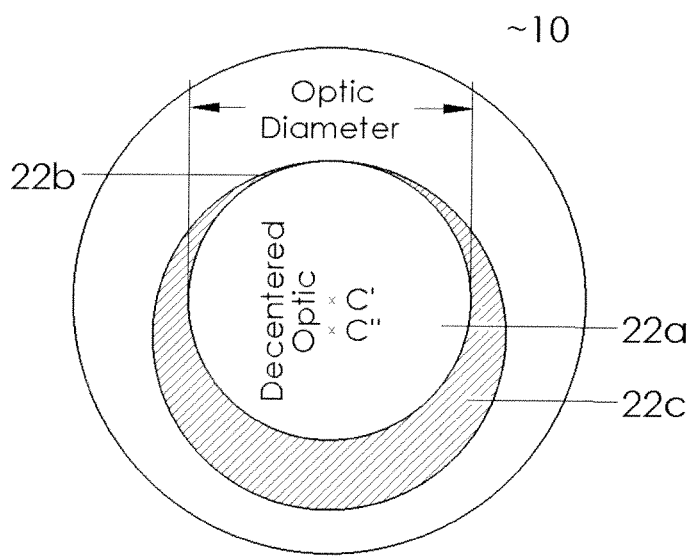
FIG. 2 is illustrative of a contact lens according to one embodiment of the present invention.

In another embodiment, optical zone 22 of lens 10 further includes a posterior optical zone 22a (also referred to herein as a posterior central optical zone) of the posterior surface which is toric (see FIG. 2). The posterior optical zone is the portion of the posterior surface that is optically corrected. As further depicted in FIG. 2, optical zone 22 of lens 10 further includes an anterior optical zone 22b which has a spherical power and is optically corrected. Posterior optical zone 22a, in combination with anterior optical zone 22b, is adapted to produce an image that is suitably corrected for vision. Such optic zones are typically, but not necessarily, centered about an optical axis, e.g., C' is the center of the optic zone for posterior optical zone 22a and C" is the center of the optic zone for anterior optical zone 22b as shown in FIG. 2. As shown in FIG. 2, anterior optical zone 22b is decentered inferiorly relative to the posterior optical zone 22a. This decentering allows for prism ballasting. In addition, the present invention provides the portion of the anterior optical zone 22b which is not aligned with posterior optical zone 22a to be peri ballasted, i.e., zone 22c. The area of the anterior optical zone 22b which lines up with posterior optical zone 22a provides optical performance. It is believed that by forming peri ballasted zone 22c, further improved comfort of the resulting lens is achieved.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only. The invention is limited only as required by the following claims and equivalents thereto.

What is claimed is:

1. A contact lens comprising a lens edge, a vertical meridian, a horizontal meridian, a superior region, an inferior region, an optical zone, a prism ballast zone and a peri ballast zone, wherein the contact lens has a dimple zone disposed between the optical zone and the lens edge and is centered on the inferior vertical meridian and spans about 5 to about 45 degrees centered on the inferior vertical meridian.

2. The contact lens of claim 1, wherein the dimple zone is in the peri ballast zone.

3. The contact lens of claim 1, wherein the dimple zone spans about 5 to about 20 degrees centered on the inferior vertical meridian.

4. The contact lens of claim 1, wherein the dimple zone spans about 25 to about 35 degrees centered on the inferior vertical meridian.

5. The contact lens of claim 1, wherein the peri ballast zone spans about 60 degrees.

6. The contact lens of claim 1, wherein the peri ballast zone spans about 40 degrees.

7. The contact lens of claim 1, wherein the peri ballast zone spans about 20 degrees.

8. The contact lens of claim 1, wherein the dimple zone has a thickness between about 25 to about 400 µm.

9. The contact lens of claim 1, wherein the dimple zone has a thickness between about 50 to about 250 µm.

10. The contact lens of claim 1, wherein the dimple zone has a thickness between about 70 to about 220 µm.

11. The contact lens of claim 1, wherein the peri ballast zone has a maximum thickness between about 100 to about 500 µm.

12. The contact lens of claim 1, wherein the peri ballast zone has a maximum thickness between about 200 to about 400 µm.

13. The contact lens of claim 1, wherein the peri ballast zone has a maximum thickness of about 240 µm.

14. The contact lens of claim 1, further comprising a prism ballast/peri ballast blend zone disposed between the optical zone and the lens edge and between the prism ballast zone and the peri ballast zone.

15. The contact lens of claim 14, wherein the prism ballast/peri ballast blend zone spans about 1 to about 40 degrees.

16. The contact lens of claim 14, wherein the prism ballast/peri ballast blend zone spans about 5 to about 20 degrees.

17. The contact lens of claim 14, wherein the prism ballast/peri ballast blend zone spans about 10 degrees.

18. The contact lens of claim 14, wherein the prism ballast/peri ballast blend zone is symmetric about the vertical meridian.

19. The contact lens of claim 18, wherein the prism ballast/peri ballast blend zone is located between 1 and 5 o'clock.

20. The contact lens of claim 18, wherein the prism ballast/peri ballast blend zone is located between 2 and 4 o'clock.

21. The contact lens of claim 18, wherein the prism ballast/peri ballast blend zone is located between 3 and 4 o'clock.

22. The contact lens of claim 18, having a maximum peri ballast thickness spanning about 20 degrees when starting at plus or minus 30 degrees from the inferior vertical meridian.

23. A contact lens comprising a lens edge, a vertical meridian, a horizontal meridian, a superior region, an inferior region, a posterior surface; an opposing anterior surface, an optical zone including a posterior optical zone and an anterior optical zone, a prism ballast zone, a peri ballast zone, and a prism ballast/peri ballast blend zone disposed between the optical zone and the lens edge, wherein the contact lens has a dimple zone disposed between the optical zone and the lens edge and is centered on the inferior vertical meridian and further wherein the peri ballast zone spans about 20 degrees and has a maximum thickness of about 240 µm, the prism ballast/peri ballast blend zone spans about 10 degrees and is located between 3 and 4 o'clock, and the dimple zone spans about 25 to about 35 degrees centered on the inferior vertical meridian and has a thickness between about 70 to about 220 µm, and a portion of the peri ballast zone intermediate the dimple zone and the prism ballast/peri ballast blend zone.

24. A contact lens comprising a lens edge, a vertical meridian, a horizontal meridian, a superior region, an inferior region, an optical zone, a prism ballast zone, a peri ballast zone, a first prism ballast/peri ballast blend zone disposed between the optical zone and the lens edge, a second prism ballast/peri ballast blend zone disposed between the optical zone and the lens edge, a portion of the peri ballast zone extending between the first and second prism ballast/peri ballast blend zones, a dimple zone disposed between the optical zone and the lens edge and centered on the inferior vertical meridian, the dimple zone bounded by portions of the peri ballast zone and the dimple zone having a thickness less than bounding portions of the peri ballast zone.

* * * * *